UNITED STATES PATENT OFFICE.

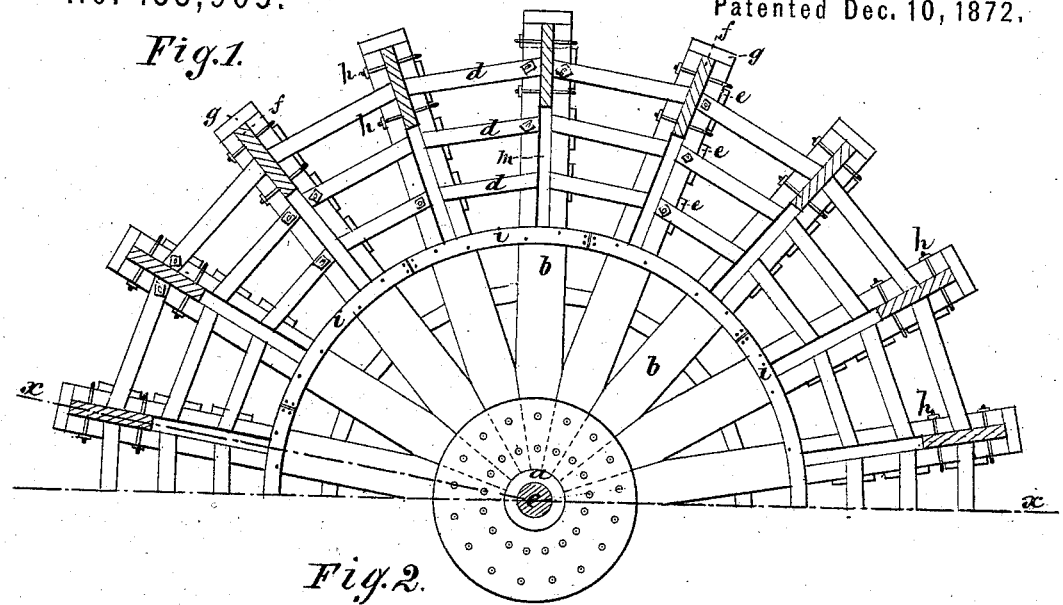
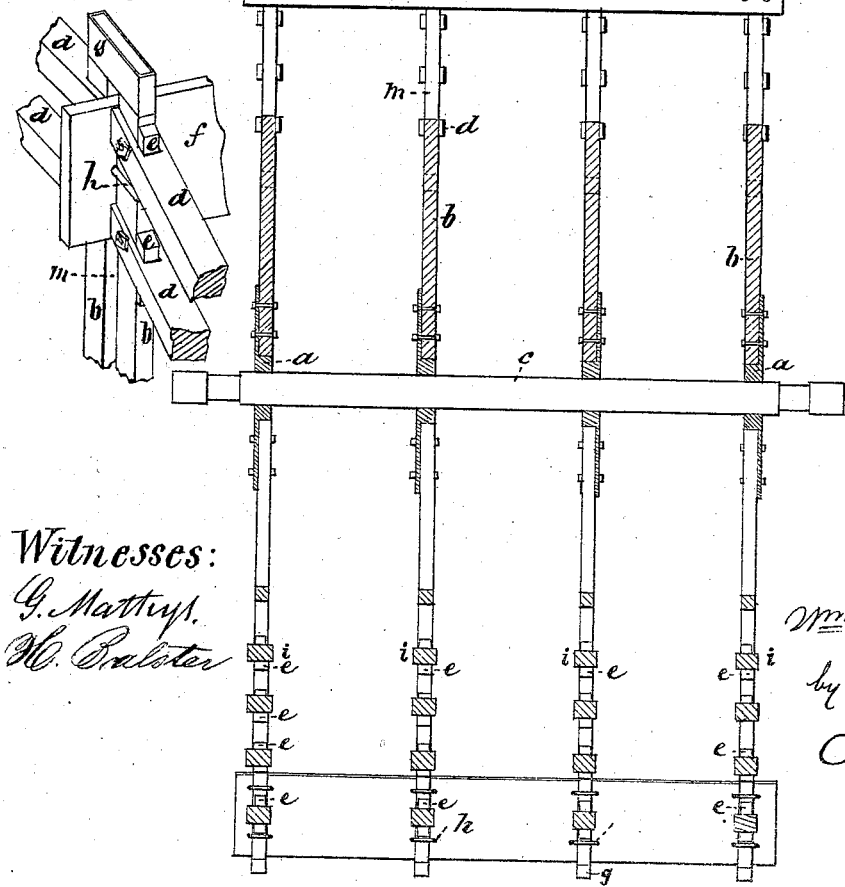
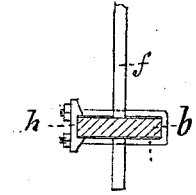

WILLIAM P. WALKER, OF MEMPHIS, TENNESSEE.

IMPROVEMENT IN PADDLE-WHEELS.

Specification forming part of Letters Patent No. 133,905, dated December 10, 1872.

*To all whom it may concern:*

Be it known that I, WILLIAM P. WALKER, of Memphis, in the county of Shelby and in the State of Tennessee, have invented certain new and useful Improvements in Paddle-Wheels; and I do hereby declare that the following is a full, clear, and exact description thereof, reference being had to the accompanying drawing and to the letters of reference marked thereon.

The nature of my invention consists in constructing paddle-wheels for steam-vessels so that the paddle boards or buckets may be shifted in slots which I provide in the spokes or arms to and from the outer end of said arms, so as to permit us to quickly and easily adjust the position of the buckets to the varying depth to which the wheel is sunk in the water by the vessel being laden, partially laden, or unladen, as will more fully hereinafter appear.

To enable others skilled in the art to make and use my invention, I will now proceed to describe its construction and operation.

In the drawing, Figure 1 represents a side elevation of one-half of a paddle-wheel constructed in conformity with my invention; Fig. 2 is a section of the same through the line $x\ x$; and Figs. 3 and 4 are detail views of parts of my invention.

$a\ a\ a\ a$ are the several hubs or centers of the wheel, with sockets wherein the spokes or arms $b\ b\ b\ b$ fit, and are securely bolted, as illustrated in Fig. 2. $c$ represents the wheel-shaft. $i$ represents a circle of iron or wood, between which the arms $b$ are firmly fastened by the screw-bolts which bind this circle into one strong whole. $g$ are stout iron bands or rings on the outer ends of the arms $b$ to strengthen them and prevent their splitting. $d$ are braces between the arms $b$, above the circle $i$, and screw-bolted to arms $b$. The holes in the braces $d$ through which the screw-bolts pass are long enough to allow the braces $d$ to be made tight or slack, at will, and at one end of each of said braces $d$, between it and the arm $b$, to which it is bolted, is a hole for the reception of a key or wedge, $e$, which keeps the braces $d$, arms $b$, and buckets $f$ firmly in position. A nail driven part the way through the key $e$ into arm $b$ holds the key in place, and may be drawn when needed. The arms $b$ have each a slot, $m$, extending from the circle $i$ to the band $g$, which slot $m$ is of the width of the paddle's thickness, and is intended to permit the shifting of the paddle $f$ from the end of arm $b$ toward the center of the wheel as far as the circle $i$. Each paddle or bucket $f$ has a stirrup, $h$, passing around each arm $b$, in whose slot $m$ the bucket $f$ may slide through the bucket $f$; and passing through a washer, $l$, that is secured by nuts $l'$, is the stirrup $h$, (see Fig. 4,) by which means the bucket $f$ is secured to the arm $b$. By simply unscrewing nuts $l'$ the washers $l$ and stirrups $h$ may be quickly removed, and the buckets or paddle-boards $f$ be shifted into the desired position, and secured in place by replacing nuts $l'$, washers $l$, and stirrups $h$.

It will be seen in the drawing that in Figs. 1 and 2 I represent each bucket $f$ as secured by two stirrups, $h$, to the arm $b$, in whose slot $m$ the bucket shifts; but instead of two I may, and preferably shall, use only one, as indicated in Fig. 3.

In Fig. 2 there are shown four cast-iron centers, $a$, which hold the inner ends of arms $b$; but the number of these centers and arms may be varied to meet the required size and strength of the wheel.

From the foregoing it will be seen how my invention meets the wants for which it is particularly designed; and that is to provide a paddle-wheel with adjustable paddles, and strong enough to contend with the heavy drift and ice which the wheels of our Western river steamers meet. Those wheels are enabled to meet such obstacles by being braced at intervals from the center out, as near as practicable, to the end of the arms, placing the buckets or paddle-boards on the edge of the arm instead of in a slot, $m$, as I do, and fastening them by stirrups that pass around the arm and through the bucket. But this manner of arranging the arms and braces is such as to render it impossible to shift the buckets more than a very few inches; whereas it is desirable at times to shift the buckets full two feet; for when the vessel is deeply laden the buckets are buried under the water from three to five feet, and unless the adjustability of the buckets can be made to correspond there will be an excessive and injurious strain on the machinery and boat, with great waste of power and consequent loss of speed. But by constructing each of the arms $h$ with a slot, $m$, and arranging the braces $d$ over and under the opposite sides of the buckets $f$, as I do, the braces $d$ can be placed close to the outer end of arms $b$, and so secure the proper strength to the wheel, and at the same time allow the greatest possible adjustability to the paddle-boards or buckets $f$, to increase or decrease the circumference of the wheel as desired.

Having thus fully described my invention, what I claim as new, and desire to secure by Letters Patent, is—

The slotted arms $b$, adjustable paddle-boards $f$, and braces $d$, when combined and arranged, as described, whereby the paddles $f$ may be adjusted as required, and the arms braced between and opposite the center of the paddles, substantially as set forth, and for the purposes specified.

In testimony that I claim the above-described certain new and useful improvements in paddle-wheels I have hereunto signed my name this 5th day of July, 1872.

WILLIAM P. WALKER.

Witnesses:
W. A. DUNLAP,
M. B. TREZEVANT.